Nov. 13, 1928.                                           1,691,463
H. R. BREWER
FRICTION MEANS FOR WINDOW SHADE ROLLERS
Filed March 1, 1926
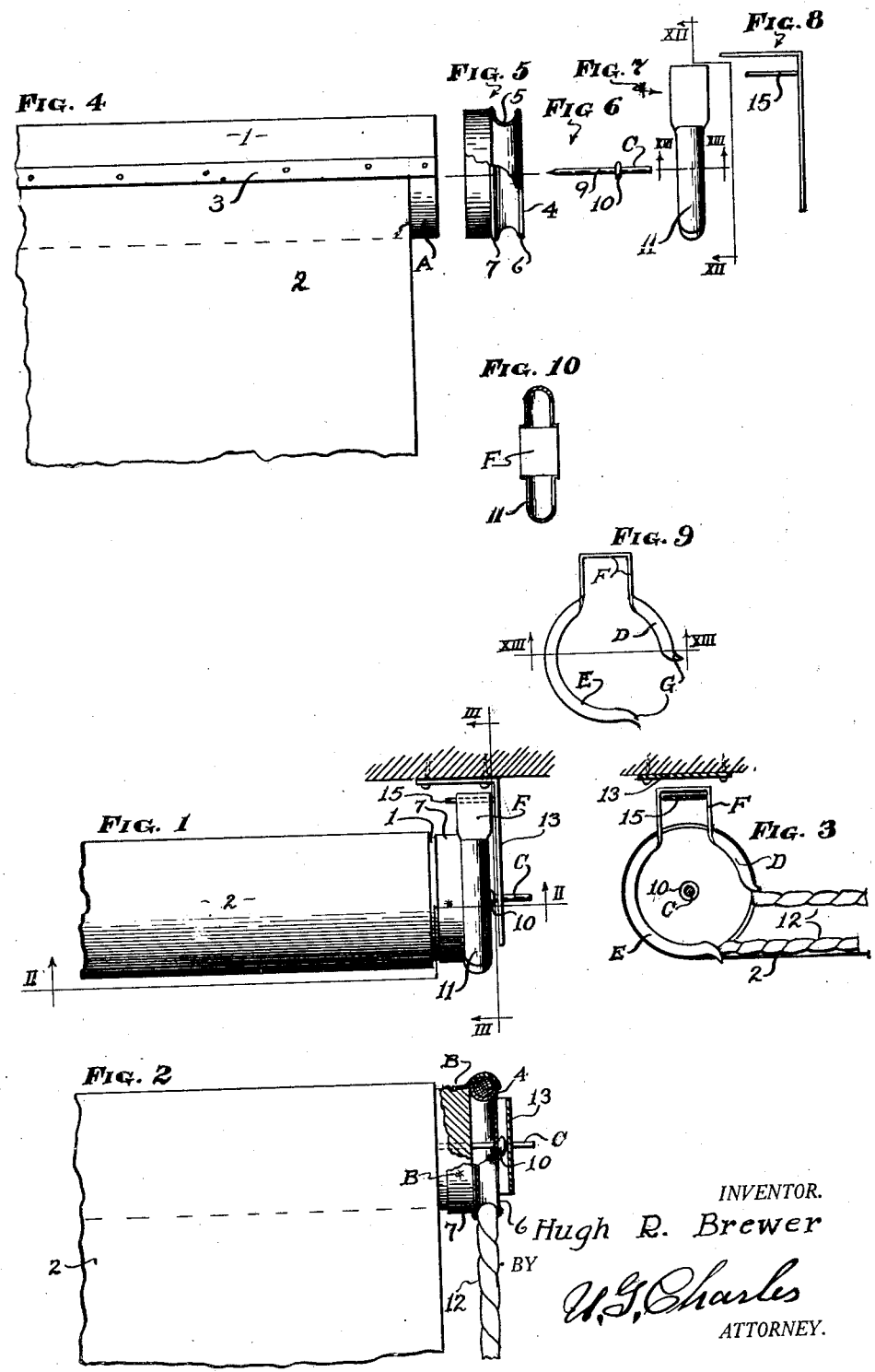
INVENTOR.
Hugh R. Brewer
BY
ATTORNEY.

Patented Nov. 13, 1928

1,691,463

UNITED STATES PATENT OFFICE.

HUGH R. BREWER, OF WICHITA, KANSAS.

FRICTION MEANS FOR WINDOW-SHADE ROLLERS.

Application filed March 1, 1926. Serial No. 91,486.

My invention relates to a friction means for window shade rollers.

The object of my invention is to manipulate the raising and lowering of the shade by other means than taking hold of the shade.

A further object of my invention is to eliminate the use of a spring in the roller.

A still further object of my invention is to provide a centering means for the trunnion.

A still further object of my invention is to provide a bracket having a detent to prevent the rotation of the friction means with the roller.

These and other objects will hereinafter be more fully explained.

Referring to the drawings:

The following views are directed by the arrows shown on the drawings:

Fig. 1 is a plan view of a shade roller with the invention installed.

Fig. 2 is a sectional view taken along the line II—II in Fig. 1.

Fig. 3 is a sectional view taken along line III—III in Fig. 1.

Fig. 4 is a front view of the shade attached to the roller.

Fig. 5 is a grooved friction thimble.

Fig. 6 is a pin functioning as a trunnion.

Fig. 7 is a plan view of the friction shoe.

Fig. 8 is a plan view of the bracket.

Fig. 9 is a side view of the friction shoe as seen along line XII—XII in Fig. 7.

Fig. 10 is a sectional view taken along the line XIII—XIII in Figures 7 and 12.

Referring to the drawings in detail, 1 is a roller having a shade 2 firmly attached thereto by means of a strip 3; 4 is a thimble having an annular knurled groove 5 on the outer portion thereof; the said thimble adapted to engage on the end of the roller as at A and firmly attached thereto by the indentation as at B in Figure 2. A flange 6 is provided on the outside of the groove, and a rib 7 on the inside, corresponding in shape to the edge of the flange; the said members being integral. Concentrically positioned in the thimble is an aperture adapted to receive the pin 9 which is driven into the end of the roller until the collar 10 contacts the thimble. The outward extending portion of the pin as at C functions as a trunnion for the roller. I have provided a friction shoe 11 which is concaved and adapted to engage on the flange and rib adjacent the groove on the thimble for the purpose hereinafter described.

The shoe consists of two concaved arcuated members D and E respectively; the said members being connected by a loop F functioning as a spring and simultaneously as a hanger to prevent rotation with the roller. The opposite ends of the members D and E are curved outward as at G as means to prevent wear on a cord 12; the said cord engaging in the knurled groove 5 and held firmly to engagement therein by means of the shoe above described.

When the thimble is placed on the end of the roller and the pin driven to axial engagement with the roller it is trunnioned in a bracket 13 which is rigidly attached to the casing of the window or opening over which the shade functions; the said bracket having an aperture to receive the outer end of the pin. Rearwardly and laterally extending from the bracket is a detent member 15; the said member adapted to engage in the loop F by which means the tension of the shoe will prevent the roller from turning under the weight of the shade, and the cord 12 heretofore described is means for revolving the roller both ways for raising and lowering the shade. The predetermined position of the shade is maintained by the friction of the shoe on the flange 6 and the rib 7.

It will be understood that the opposite end of the roller will be equipped with a pin axially and trunnioned in a bracket (said bracket not being shown).

Such modifications may be employed as lie within the scope of the appended claim.

Having thus described my invention, what I claim as new and desire to secure by Letters Patent is:—

In a friction means for window shade rollers, a thimble comprising an annular groove, a flange and a rib adjacent the sides of the said groove, two concaved shoe segments integrally connected by a rectangularly shaped loop to function as a spring tensioning means for the segments and as means to engage with a detent to prevent rotation, said shoe segments tensioned and frictionally engaging with said flange and rib as braking means for the roller, a pin centrally positioned in the thimble, a bracket having a laterally extending detent, the pin trunnioned in the bracket, the detent engaging in the rectangular spring member of the shoe segments, all as, and for the purpose described.

HUGH R. BREWER.